May 5, 1931. J. W. MAYDEN 1,804,363
AUTO TABLE FOR SAFEWAY GARAGES
Filed Aug. 11, 1930 4 Sheets-Sheet 1
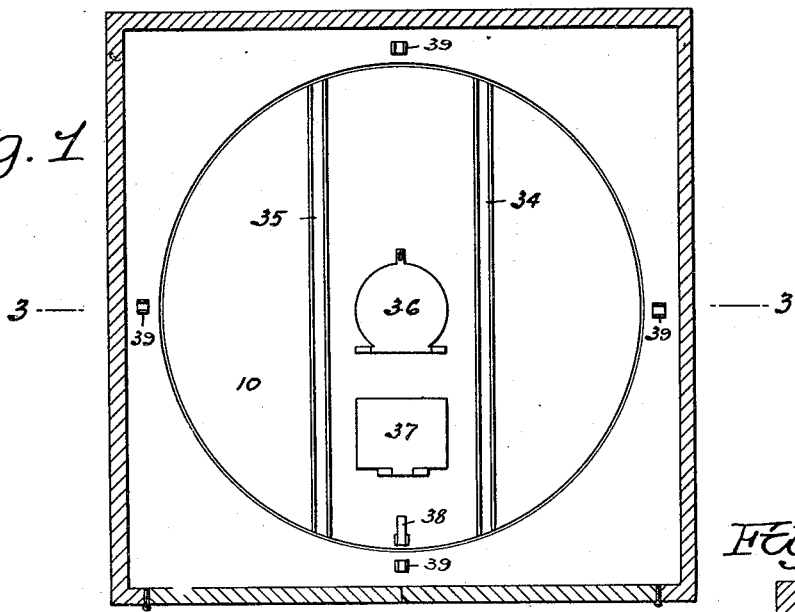
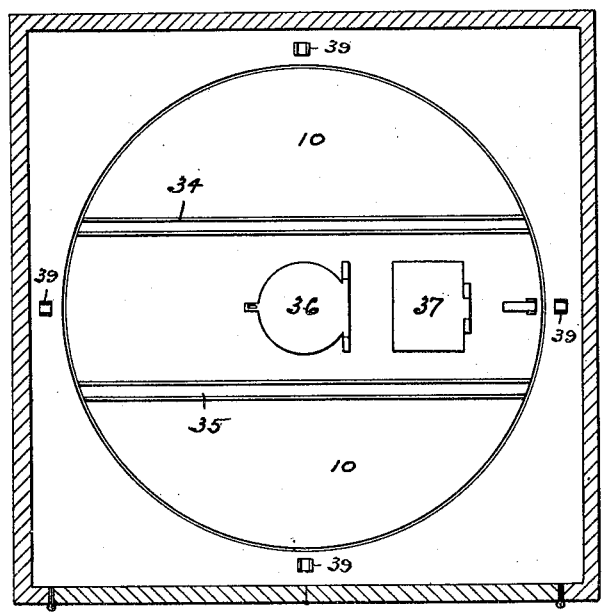
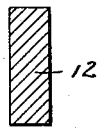
Fig. 16.
Fig. 17.
Fig. 18.
JOHN W. MAYDEN
INVENTOR
BY *Victor J. Evans*
ATTORNEY
WITNESS:

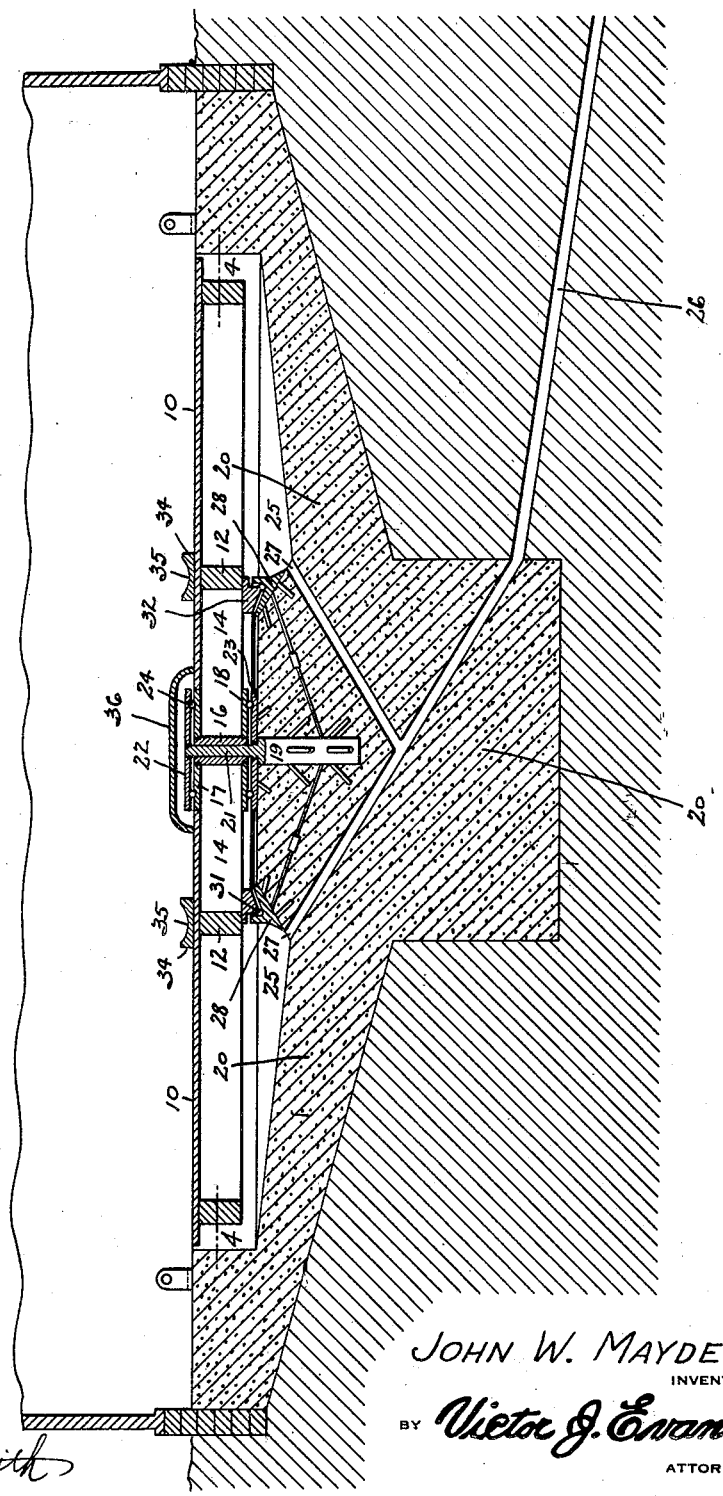

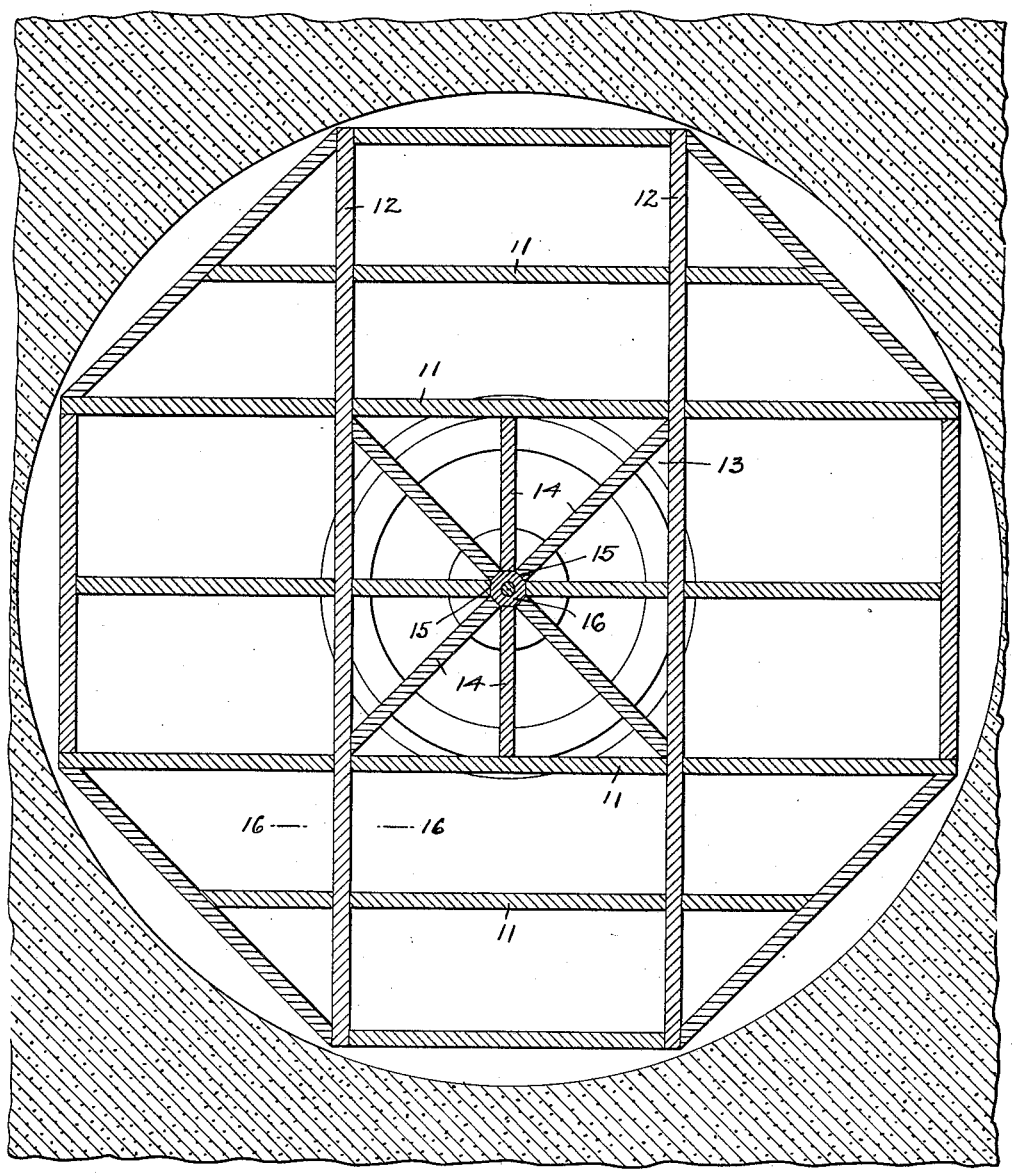

May 5, 1931.  J. W. MAYDEN  1,804,363
AUTO TABLE FOR SAFEWAY GARAGES
Filed Aug. 11, 1930    4 Sheets-Sheet 4
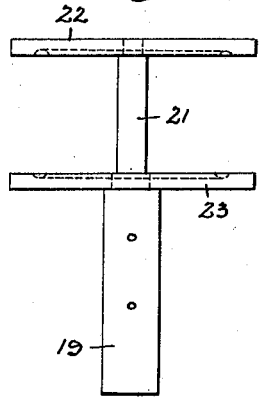
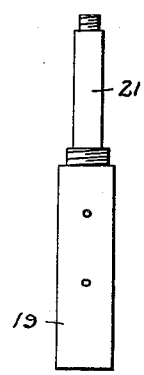
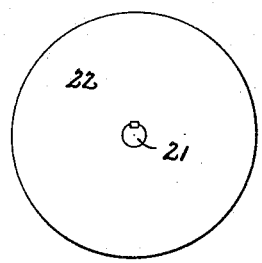
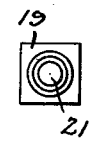
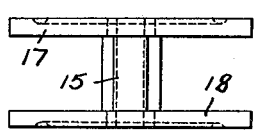
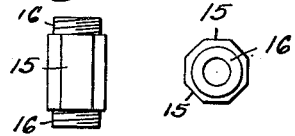
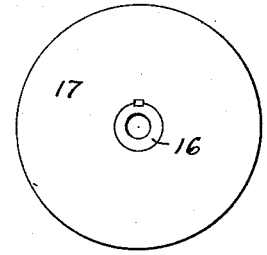
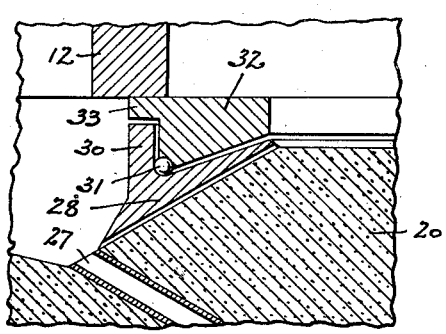
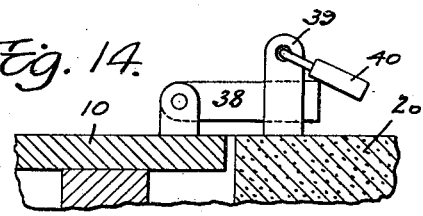
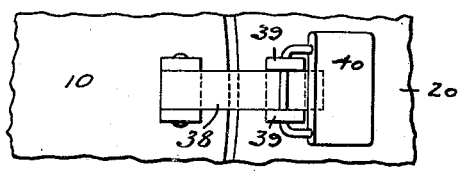
JOHN W. MAYDEN, INVENTOR
BY Victor J. Evans
ATTORNEY Patented May 5, 1931

1,804,363

UNITED STATES PATENT OFFICE

JOHN W. MAYDEN, OF WELEETKA, OKLAHOMA

AUTO TABLE FOR SAFEWAY GARAGES

Application filed August 11, 1930. Serial No. 474,629.

This invention relates to certain new and useful improvements in turn table construction and which embodies as its principal characteristic bearing structures supporting the entire bulk of the table and upon which the laden table may be easily and expeditiously turned.

Another object of the invention consists of anchorage means for the table disposing the bearing structures in positions whereby tilting of the table will be obviated.

Another object of the invention contemplates the provision and arrangement of a locking mechanism for the table whereby the latter and the vehicle supported thereby may be disposed at right angles to the entrance opening of the garage.

With the above and other objects in view, the invention further consists of the following novel features and details of construction, to be hereinafter more fully described, illustrated in the accompanying drawings and pointed out in the appended claims.

In the drawings:—

Figure 1 is a top plan view of the turn table arranged within a single car garage with the wheel tracks in alignment with the garage door.

Figure 2 is a view similar to Figure 1 showing the vehicle tracks arranged at right angles to the garage door.

Figure 3 is a sectional view taken on line 3—3 of Figure 1.

Figure 4 is a sectional view taken on line 4—4 of Figure 3.

Figure 5 is a side elevation of the anchorage means and complemental sections of the bearing structures.

Figure 6 is an elevation of the anchorage means per se.

Figure 7 is a top plan view of the Figure 5 assemblage.

Figure 8 is an end elevation of the anchorage means.

Figure 9 is a view similar to Figure 5 of a hub structure for the turn table and complemental bearing sections therefor.

Figure 10 is an elevation of the hub per se.

Figure 11 is an end elevation of the hub.

Figure 12 is a top plan view of the Figure 9 assemblage.

Figure 13 is an enlarged detail sectional view taken through the other bearing structure for the table.

Figure 14 is a detail sectional view taken through appropriate portions of the table and garage floor, showing the arrangement of the locking means.

Figure 15 is a top plan view of the Figure 14 arrangement.

Figures 16, 17 and 18 are sectional views taken through optional forms of beams for the under structure of the turn table.

Referring to the drawings in detail wherein like characters of reference denote corresponding parts, the reference character 10 indicates generally the top or platform of the turn table supported upon beams 11 and 12, intersecting at right angles to each other and arranged to define a square 13 adjacent the center thereof. Spokes 14, radially projecting from the center of the square and abutting the facets 15 of a hub member 16, are secured at their outermost ends to the inner sides of the frame structure, circumscribing the square 13 in the manner best shown in Figure 4. Disk members 17 and 18, screw threaded and keyed to the ends of the hub 16, are designed to overlie the immediate side edges of the spokes 14 as shown in Figure 3 of the drawings.

The anchorage means, alluded to in the foregoing, comprises a standard 19 suitably embedded within a concrete base 20 and provided with a reduced extension 21 journally accommodated within the bore of the hub 16 and from which the latter may rotate. Disk members 22 and 23, arranged at intervals upon the reduced extension 21, are disposed in close proximity to the disks 17 and 18 respectively, as suggested in Figure 3 of the drawings to accommodate ball bearings 24 receivable within raceways especially provided for the purpose. The rectilinear disposition of the disk 22 upon the reduced extension 21 will suffice as the means of adjustment for the bearing structures located upon opposite sides of the spokes. A drainage pit 25, formed within the bottom of the pocket for the table in the base 20, is in communication with a drain 26 through canals 27. An annular collar 28 reposing against an upwardly inclined surface of the base above the entrance openings of the canals 27, is provided with an upstanding ledge 30 against which a circumferential row of ball bearings 31 may repose. A ring 32 supported upon the frame, circumscribing the square 13, is shaped in conformity to the upper surface of the collar 28 behind the ledge 30 therefor and to engage the ball bearings 31. A flange portion 33 outstanding from the side edge of the ring 32 above the ledge 30 is designed for contacting engagement with the latter to alleviate undue bearing strain against the ball bearings 31 when excessive strain is brought to bear against any portion of the turn table adjacent the periphery thereof.

From the foregoing, it is understood that a most effective form of mounting is provided for the turn table whereby same may be easily and expeditiously shifted to occupy its several positions while laden with a motor vehicle. In order to alleviate the strain aforementioned and to facilitate disposing of the vehicle in a position upon the turn table so that the vehicle will not scrape against the walls of the garage while being turned, I provide tracks or guides 34 having grooves or channels 35 within the upper surfaces thereof to accommodate the tires of the vehicle. As shown in Figures 1, 2 and 3 of the drawings, the disk 22 is obscured from view by a cover 36 and to prevent the accumulation of extraneous matter therebeneath to hamper the proper operation of the bearing structure. Closures 37 are also provided in the top of the turn table to permit access to the pit 25 to open up the canals 27 when clogged or to remove any obstructions in the path of the beams or spokes.

As mentioned in the foregoing, the turn table may be shifted to dispose the vehicle in any position within the garage; for instance, after the car has been driven into the garage, the turn table may be shifted a half turn to nose the car toward the garage doors whereby the vehicle may be driven out nose first rather than being backed out. If desired, the table and vehicle can be disposed to occupy positions in either direction at right angles to the garage doors and locked through the instrumentality of a hasp 38 and yoke 39. A padlock 40 being employed for the purpose of preventing unauthorized manipulation of the hasp.

The invention is susceptible of various changes in its form, proportions and minor details of construction and the right is herein reserved to make such changes as properly fall within the scope of the appended claims.

Having described the invention, what is claimed is:

1. A turn table construction comprising a platform supported by beams intersecting in rightangularly disposed relation and defining a square centrally beneath the platform, a hub for the turn table, spokes radially disposed within the square and abutting said hub, a standard journally associated with said hub, disk members arranged upon the ends of the hub and abutting the opposed side edges of the spokes, disks carried by the standard journally associated with the first mentioned disks, and an auxiliary bearing structure cooperatively associated with the first mentioned bearing structures to alleviate tilting of the table.

2. A turn table construction comprising a platform supported by beams intersecting in rightangularly disposed relation and defining a square centrally beneath the platform, a hub for the turn table, spokes radially disposed within the square and abutting said hub, a standard journally associated with said hub, disk members arranged upon the ends of the hub and abutting the opposed side edges of the spokes, disks carried by the standard journally associated with the first mentioned disks, a ring carried by the spokes and depending from the square, a collar located in juxtaposition to the ring and journally associated therewith, a ledge upstanding from the collar, and a flange portion carried by the ring designed for abutting engagement with the ledge to alleviate undue tilting of the table and strain upon the respective bearing structures.

In testimony whereof I affix my signature.

JOHN W. MAYDEN.